UNITED STATES PATENT OFFICE 2,619,502

N,N''-DIBENZYL-N,N',N''-TRIALKYL-DIALKYLENE TRIAMINES

William W. Williams, Easton, Pa., and Albert F. Strobel, Phillipsburg, N. J., assignors to General Aniline & Film Corporation, New York, N. Y., a corporation of Delaware No Drawing. Application June 23, 1950, Serial No. 170,032

12 Claims. (Cl. 260—570.9)

The present invention relates to N,N''-dibenzyl-N,N',N''-trialkyl-dialkylene triamines and to a process of preparing such triamines per se and in admixture with symmetrical dialkyl dibenzyl alkylene diamines and symmetrical N,N'''-dibenzyl N,N',N'',N''' - tetraalkyl trialkylene tetramines which are particularly useful as gas fading inhibitors for dyeings on cellulose derivatives.

It is well known that many otherwise desirable dyes for cellulose derivatives suffer from the disadvantage that they are not fast to gas fumes, that is, the dyeings produced therewith become duller and change shade after exposure to such gases. While this phenomenon is not restricted to blue dyes derived from anthraquinone, it is particularly noticeable with such dyes because the gas fading effect is found to be more marked in the blue region of the spectrum. The antraquinone blues and violets on cellulose derivatives have the characteristic of being extremely fast to light, washing, dry cleaning, and the like, and are most desirable dyes on cellulose derivatives excepting for the peculiarity they possess of changing to a pink or gray shade in the presence of coal gas.

This tendency of dyeings on cellulose derivatives to undergo fading when subjected to gas fumes has been recognized for many years, and since the advent of United States Patent 1,723,230 in 1929, many organic and inorganic bases have been proposed as inhibitors for such gas fading. While many of the compounds so suggested have attributes which recommend their use in the stated relationship, nevertheless none of the compounds have all of the attributes necessary to permit them to completely fulfill the task of inhibiting gas fading to the degree desired in commercial application.

It is recognized that the ability of a compound to inhibit gas fading is proportional to the amount of the basic groups that a compound is capable on a weight basis of introducing into a cellulose derivative. For example, dimethylamine is theoretically capable of introducing more basic groups on a weight basis than more complex amines suggested as inhibitors for gas fading. Unfortunately, however, dimethylamine is too soluble in water to be completely extracted from water by cellulose derivatives.

United States Patent 2,017,119 discloses as inhibitors for gas fading various aralkylamines. However, due to the large amount of such compounds which are necessary to inhibit gas fading, and due to the only moderate fastness to washing, dry cleaning, and sublimation of such compounds, they have found little commercial use as inhibitors.

N,N'-diphenyl ethylenediamine is disclosed in United States Patent 2,416,380. This compound, while permanent, has the marked peculiarity that it tends to develop a color of its own on exposure to gas fumes, as a consequence of which it changes a pastel blue dyeing to a green shade.

There are many requirements which a gas fading inhibitor must meet in order to be acceptable from a practical standpoint. These requirements are as follows:

(1) It must prevent fading of the dyed cellulose derivatives when exposed to gas.

(2) It must be and remain colorless, i. e., introduce no color of it own when exposed to gas. (This criterion, as noted above, is important for pastel dyeings where any color introduced by the inhibitor would effect a marked change in shade.)

(3) It must give no discoloration on prolonged exposure to sunlight.

(4) It must be fast to dry cleaning and wet washing.

(5) It must be fast to sublimation.

(6) It must be odorless and non-toxic.

(7) It should be suitable for direct dyeing along with the dye in the dye bath. To this end it must exhaust from the dye bath by having a natural affinity for cellulose derivatives and be capable of being suitably emulsified or dispersed in water to assure level dyeing.

When these factors are added up, it is no wonder that the art has been searching so fruitlessly for so many years in order to obtain a gas fading inhibitor which will be eminently satisfactory from a commercial standpoint.

We now have discovered that products which meet all of the above requirements and the needs of the art as gas fading inhibitors for dyeings on cellulose esters and ethers are N,N''-dibenzyl-N,N',N''-trialkyl-dialkylene triamines per se, or in admixture with symmetrical dialkyl dibenzyl alkylene diamines and symmetrical dibenzyl N,N',N'',N''' - tetraalkyl-trialkylene tetramines.

To provide the N,N'' - dibenzyl - N,N',N''-trialkyl-dialkylene triamines and the process of preparing the mixture of the corresponding diamines, triamines, and tetramines constitutes the purpose and object of the present invention.

The N,N''-dibenzyl-N,N',N''-trialkyl - dialkylene triamines and the mixture of the corresponding diamines, triamines, and tetramines are not only useful as gas fading inhibitors of dyeings on cellulose derivatives, but are also excellent fungicides, bactericides, anti-oxidants, and are useful for the preparation of spirit soluble azo dyestuffs. The mixture of the diamine, triamine, and tetramine gas fading inhibitor has the advantage over the diamine alone in that at higher concentrations in gas fading compositions (3% to 5% based on the weight of the fiber) the mixture is more effective than an equal weight of the diamine alone.

The N,N''-dibenzyl-N,N',N''-trialkyl - dialkylene triamines contemplated as new and useful compounds in accordance with the present invention are characterized by the following general formula:

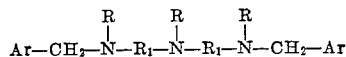

wherein Ar is a phenyl type radical, i. e., phenyl, alkylphenyl, e. g., tolyl, ethylphenyl, butylphenyl, and the like, halogenophenyl, e. g., chlorophenyl, bromophenyl, dichlorophenyl, dibromophenyl, etc., alkoxyphenyl, e. g., anisyl, ethoxyphenyl, propoxyphenyl, etc., carbalkoxyphenyl, e. g., carbomethoxyphenyl, carbethoxyphenyl, carbopropoxyphenyl, etc., aryloxyphenyl, e. g., phenoxyphenyl, methylphenoxyphenyl, etc., cyanophenyl, etc.; R represents an alkyl radical of not more than 6 carbon atoms, e. g., methyl, ethyl, propyl, butyl, and hexyl; $R_1$ represents an alkylene group, i. e., any aliphatic open chain linking component, such as methylene, ethylene, trimethylene, propylene, tetramethylene, pentamethylene, 2-methyl-1,3-propylene, 3,3,3-trimethyl - 1,2 - propylene, 2,3-butylene, and the like.

The triamines characterized by the foregoing formula may be prepared as such or in admixture with symmetrical dibenzyl alkylene diamines having the formula:

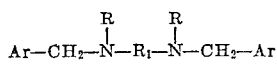

and symmetrical dibenzyl tetraalkyl trialkylene tetramines having the following formula:

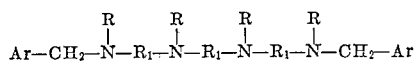

wherein Ar, R and $R_1$ have the same values as above.

The N,N''-dibenzyl-N,N',N''-trialkyl - dialkylene triamines characterized by the above formula are prepared by the reaction of a benzyl halide, such as bromide or chloride with trisubstituted triamines of the type:

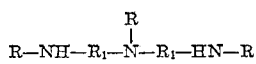

wherein R and $R_1$ have the values as described above.

The trisubstituted triamines are readily prepared according to the process described in United States Patent 2,279,294, which discloses examples of such triamines contemplated herein for the reaction with a benzyl halide. In general, the process involved in said patent comprises reacting equimolar amounts of a primary aliphatic amine, an N,N'-di-alkyl substituted alkylene diamine, and an alkylene dihalide, such as bromide or chloride.

The trisubstituted triamines may also be prepared by reacting an alkylene dihalide with a primary aliphatic amine, making the reaction mixture strongly alkaline, separating the oily layer, drying, and fractionally distilling. If the proportion of reagents used is at an optimum, a considerable proportion of a fraction consisting of trisubstituted triamine will be collected.

The benzyl halide, i. e., bromide or chloride, which may be reacted with a trisubstituted triamine may be either substituted or unsubstituted, such as, for example, benzyl chloride, benzyl bromide, 3-methylbenzyl chloride or bromide, 3,4-di-methylbenzyl chloride or bromide, 5-chlorobenzyl chloride or bromide, o-bromobenzyl chloride or bromide, and the like.

The following are examples of suitable alkylene dihalides, i. e., the bromides and chlorides which may be reacted to yield the trisubstituted triamines, and examples of suitable primary aliphatic amines.

*Alkylene dihalides* ethylene chloride
1,3-propylene chloride
tetramethylene chloride
pentamethylene chloride
1,2-propylene chloride
2,3-butylene chloride

*Primary aliphatic amines* methylamine
ethylamine
N-propylamine
isopropylamine
N-butylamine
secondary butylamine
tertiary butylamine In practicing the present invention, the N,N''-dibenzyl-N,N',N''-trialkyl - dialkylene triamines may be prepared as follows:

Six to six and a half chemical equivalents of a primary aliphatic amine are charged into a pressure vessel; then one chemical equivalent of an alkylene dihalide is added gradually over a three hour period. After the dihalide has been added, the temperature is kept constant at about 70–90° C. for 2 to 3 hours. The mixture is cooled to a temperature ranging from room temperature to 60° C. and the excess amine evaporated. Dry sodium hydroxide, or similar strong base, is added to the cooled reaction mixture and the excess primary aliphatic amine is distilled off by heating the pressure vessel to 70–90° C. for about 2 to 3 hours. Approximately four chemical equivalents of unreacted primary aliphatic amine may be recovered. The pressure vessel is then cooled to room temperature, opened, and a sufficient quantity of benzene or similar inert solvent added to aid in removing the slurry which contains a mixture of amines and sodium halide. The salt is filtered off and washed with benzene. The benzene-water filtrate containing the mixture of amines some of which are dissolved is then fractionally distilled and the benzene-water azeotrope is collected at vapor temperature of about 69° C. The benzene-water mixture collected is separated and the benzene fraction of it is added to the pressure vessel, and more benzene-water distilled off until no more water is collected. The temperature in the vapor rises to 81° C. when no more water is distilled and benzene alone is collected at this temperature.

After the benzene is fractionally distilled off, the symmetrical dialkyl-alkylene diamine is distilled off. The residue is then fractionally distilled at reduced pressure. The first fraction distilled at reduced pressure consists of the trialkyl-dialkylene triamine.

The trialkyl-dialkylene triamine compounds are benzylated as follows:

To a one molar solution of the triamine in benzene is added ½ mol of a benzyl halide. The mixture is then heated at 60–70° C. until the added benzyl halide is completely reacted. (The endpoint of this reaction may be determined by withdrawing small aliquots of the benzene solution occasionally, slurrying with water, and measuring the pH.) When the pH as determined in this manner drops no further, the ½ mol of benzyl halide has reacted. After the ½ mol of benzyl halide has reacted, ½ mol of aqueous caustic is added, and the mixture is stirred until the pH of a withdrawn sample rises no higher (tested as described above). After this another ½ mol of benzyl halide is added, and the mixture stirred until reaction is complete. It is then neutralized with aqueous caustic as described above. The same procedure is repeated until a total of 2 mols of benzyl halide and 2 mols of aqueous caustic has been added and reacted completely in the above described portionwise manner.

The benzene solution then is treated with water and the layers separated. The benzene then is distilled from the product, leaving as residue the desired dibenzyl trialkyldialkylene triamine.

For instance, 1,2-dichloropropane and methylamine are reacted to give a mixture of compounds:

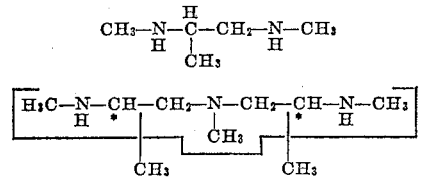

and

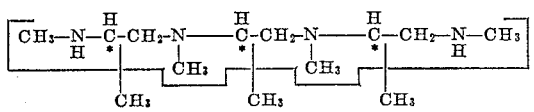

etc., which may be benzylated without separation of the products to give a mixture of dibenzyl amines of the type:

(a)

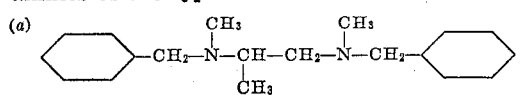

(b)

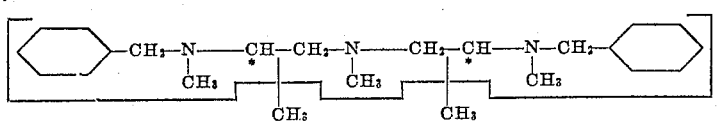

(c)

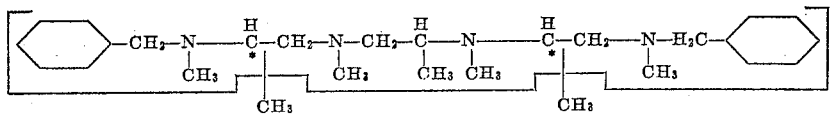

The mixture of amines is extracted with dilute aqueous hydrochloric acid, whereupon the compounds (b) and (c) are converted to hydrochlorides before (a). In other words, (b) and (c) contain amino groups which are considerably more basic than are those of (a). In competing for a limited amount of acid, (b) and (c) are converted to water-soluble monohydrochlorides before (a). Thus, by extracting the total mixture with a calculated amount of dilute hydrochloric acid, it is possible to isolate (a). The aqueous mixture consisting of (b), (c), etc., is then converted to the complete hydrochlorides (i. e., all amino groups acidified) using strong hydrochloric acid, and (b) may be separated out as the trihydrochloride on treating the aqueous acid solution with salt. The crystalline trihydrochloride of (b) after filtering off may be converted back to the free amine by treatment with aqueous caustic soda, whereupon it forms an oily layer on top of the aqueous layer. This general technique is illustrated by Example V below.

Or again, ethylene chloride and methylamine are reacted and the reaction mixture fractionally distilled after alkalizing and drying. The symmetrical ethylenediamine:

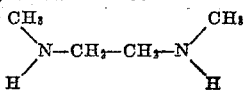

is the first fraction collected, and the second fraction consists of N,N',N''-trimethyl-diethylene triamine:

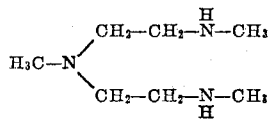

which is then benzylated with benzyl chloride, and the resulting N,N''-dibenzyl-N,N',N''-trimethyl-diethylene triamine, characterized by the formula:

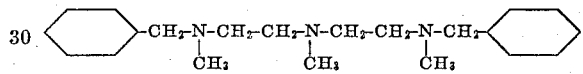

is isolated and purified.

The reaction products of ethylene chloride and methylamine may be benzylated without separation to give a mixture of symmetrical N,N'-dibenzyl-N,N'-dimethyl ethylenediamine, symmetrical N,N''-dibenzyl-N,N',N''-trimethyl-diethylene triamine and symmetrical N,N'''-dibenzyl-N,N',N'',N'''-tetramethyl triethylene tetramine of the formula:

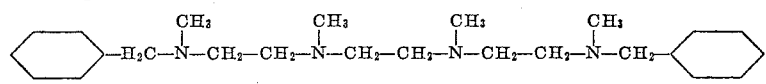

This mixture may be separated from any monobenzylated amine and other products (like N,N'-dimethyl piperazine) by extraction or fractional distillation at reduced pressure.

Although the invention is not to be limited thereby, the following examples will illustrate how the present invention may be practiced.

PREPARATION OF DIBENZYL TRIAMINES

*Example I*

1535 grams of anhydrous methylamine is placed in a one gallon autoclave and for a three hour period there is gradually added at 70° C. 735 grams of ethylene chloride. After all the ethylene chloride has been added, the temperature is kept at 70° C. for 2 hours. The reaction mixture is cooled to 40° C. and the excess free methylamine evaporated. 600 grams of dry sodium hydroxide is added. The methylamine is distilled off by heating the autoclave to 70° C. and the distillate collected in a receiving vessel is cooled in dry ice bath containing methanol. In three hours a total of 1070 grams of methylamine is collected, thus indicating that 465 grams is actually used during the condensation reaction. The autoclave is cooled to room temperature, opened, and 800 grams of benzene added. The slurry is removed, the salt filtered off and washed with 1000 grams of benzene. Titration of an aliquot portion of the filtrate showed 11.5 equivalents of amine present.

In benzylating the crude reaction product obtained above, the filtrate is transferred to a 5-liter, 4-necked flask equipped with a thermometer, stirrer, condenser, and dropping funnel. Two hundred and fifty grams of benzyl chloride are dropped into the flask over a half hour period at about 55° C. The mixture is stirred for 2 hours at 60° C. and then 78 grams of dry sodium hydroxide pellets added. The heating is continued for a half hour at 60° C. and this operation is repeated three more times by the addition of 250 grams of benzyl chloride followed by 78 grams of sodium hydroxide and the stirring continued for the same length of time after each addition as in the first. Then at 55° C. a final portion of 125 grams of benzyl chloride is added dropwise over a half hour period and heating continued for 3 hours at 60° C. A total of 1125 grams of benzyl chloride and 312 grams of caustic soda is utilized in the four repeated operations.

The benzene is then distilled off from the mixture, and about 1700 mls. of benzene is collected (which contains 0.7 equivalent of amine). The material in the flask is transferred to a separatory funnel and treated with 1600 mls. of water. After shaking thoroughly the aqueous layer is separated off and the top layer (organic) is treated with 600 mls. of water, shaken, and the aqueous layer drawn off. The material is then treated with an additional 300 mls. of water, shaken, and the water layer drawn off. The resulting organic layer, weighing about 1180 grams, consists of a mixture containing 60% symmetrical dimethyl dibenzyl ethylenediamine, 30% of N,N''-dibenzyl-N,N',N''-trimethyl-diethylene triamine, and 10% of dibenzylated higher amine condensation products.

*Example II*

In preparing N,N''-dibenzyl-N,N',N''-trimethyl diethylene triamine, the condensation reaction of methylamine and ethylene chloride is run in the same way as in Example I. As before the salt is filtered off, the cake washed with 1000 grams of benzene, and the benzene-water filtrate containing the mixture of amines is then fractionally distilled, the water-benzene layer being collected at a vapor temperature of 70° C. The benzene-water mixture collected is separated, the benzene added to the autoclave, and the benzene-water mixture distilled off until no more water is collected. The temperature in vapor rises to 80° C. when no more water is distilled, and benzene alone is collected at this temperature. At 116–119° C., at atmospheric pressure, the symmetrical dimethyl ethylenediamine is distilled off.

The residue in the autoclave is distilled at 1.0 mm. of mercury and the fraction distilling at 60° C. is distilled and the residue discarded. The distillate, which is substantially N,N',N''-trimethyl diethylene triamine, is benzylated as in Example I. The compound obtained after the extraction procedure described in Example I is (by analysis) N,N''-dibenzyl-N,N',N''-trimethyl diethylene triamine and is characterized by the formula:

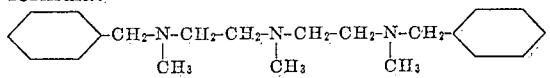

*Example III*

By preparation of:

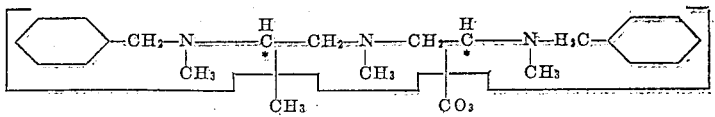

1535 grams of anhydrous methylamine are placed in a 1 gallon autoclave and 840 grams of 1,2-dichloropropane are added gradually over a 3 hour period at 90° C. After all the dichloropropane has been added, the temperature is gradually raised to 105° C. and held at this point for 2 hours. The product then is cooled to 40° C., the excess methylamine is evaporated off, and 600 grams of dry sodium hydroxide are added. The methylamine is distilled off by raising the temperature in the autoclave to 70° C. and collected by cooling the receiver in a Dry-Ice alcohol bath. When all the methylamine is removed, the product is cooled to room temperature and 800 grams of benzene are added. The salt is removed by filtration, and the salt cake is washed with 1 liter of benzene. The combined filtrate and washings are distilled through a fractionating column. A mixture of water and benzene is distilled off at 69° C. (1 atmosphere). After all the water is distilled off, the temperature rises to 80° C. Almost pure benzene then distills over. When the benzene is completely removed by distillation, the temperature rises to 124° C. Then the compound

is distilled over at this temperature (1 atmosphere). The residue is transferred to a vacuum distilling system and at 26 mm. of mercury and 50–65° C. the final product is distilled. It is characterized by the formula:

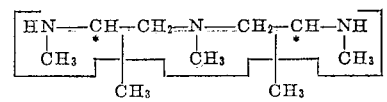

which was established by chemical analysis.

The benzylation of the material is carried out as follows:

Sixteen grams of the above compound are mixed with 100 mls. of benzene and 5 mls. of water in a 250 mls. round bottom flask. It is benzylated with a total of 30.5 grams of benzyl chloride (80% of theoretical) as follows:

Seven and six-tenths grams of benzyl chloride are dripped in at 50° C. The mixture is stirred at 65° C. for 4 hours. Two and three-tenths grams of sodium hydroxide pellets are added at 50° C. and the whole stirred for 1 hour. Another 7.6 grams of benzyl chloride are dripped in at 50° C. and stirred for 3 hours at 65° C. Then 2.3 grams of sodium hydroxide pellets are added and the stirring continued for 1 hour. After this a third portion of 7.6 grams of benzyl chloride is dripped in at 60° C., and the mixture stirred for 3 hours at 65° C. Then 2.3 grams of sodium hydroxide pellets are added and the whole stirred for 1 hours. Finally the fourth and last portion of 7.6 grams of benzyl chloride is added and the reaction mixture is stirred for 7 hours at 70° C.

The mixture is cooled, diluted with 200 mls. of water and then is made acid to Congo paper (blue) with 25 mls. of concentrated hydrochloric acid. All the benzene is evaporated off on a steam bath, the residue is cooled, and treated with 35 mls. of 40% sodium hydroxide. The two layers are separated and the top organic layer washed with 75 mls. of saturated salt solution. The top layer consists of the desired compound, N,N'' - dibenzyl-N,N',N''-trimethyl-di-(1,2-propylene)-triamine.

*Example IV*

In the same manner as in Example III, trimethylene chloride is condensed with ethylamine to yield:

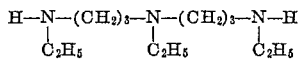

which can be benzylated as in Example V to yield:

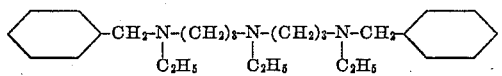

It is important that the benzyl chloride be added in small portions and that after each added portion has reacted, sufficient base be added to convert the amine hydrochloride to free amine. After each portion is neutralized, another fraction of benzyl chloride is added, allowed to react completely, then treated with base. It is not necessary that the base used be sodium hydroxide, since anhydrous sodium carbonate or possibly other bases like lime may be used as well. The small amount of water present is required to dissolve the sodium hydroxide pellets to permit neutralization of the hydrochloride formed. We believe that this method of benzylating diamines is more successful and gives much better yields than any method of forming benzyl derivatives which we have seen reported in the literature. The success in preparing these compounds with practically no formation of quaternary ammonium chloride is only possible as a result of this technique.

Of course, in the presence of an excess of an acid binding agent like sodium carbonate or triethanolamine, etc., which would not react appreciably with benzyl chloride, it would also be possible to get the reaction to proceed efficiently. It is absolutely essential that the triamino compound to be benzylated be in the form of the free base and not be a partial hydrochloride, since it does not come into contact with the benzyl chloride as the partial hydrochloride, but either precipitates out of the benzene layer or dissolves in the water phase.

*Example V*

Example III was repeated with the exception that 840 grams of 1,2-dichloropropane are replaced by a molecular equivalent amount of ethylene dichloride. The excess ethylamine is distilled off after treating with sodium hydroxide. The total mass is dissolved in benzene and treated with a number of equivalents of benzyl chloride equal to 80% of the number of equivalents of free amine present in the portionwise manner of Example IV. The hydrochloride formed from each portion of benzyl chloride after it has reacted with the amine is treated with sodium hydroxide and, after all the benzyl chloride has been reacted, the whole two phase system is brought to a pH of 12 and the layers separated. The benzene layer is washed with water, then treated with water and hydrochloric acid until the pH of the aqueous layer is 7. The aqueous extract of the hydrochlorides is then separated from the benzene solution. The benzene solution consists essentially of the diamine having the following formula:

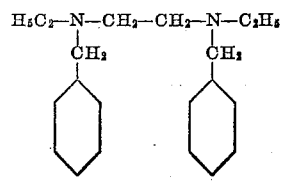

The aqueous extract of hydrochlorides is brought to a pH of 1 with concentrated hydrochloric acid and salted out with sodium chloride. The compound characterized by the following formula precipitates as the hydrochloride. It is filtered off and converted to the free base with sodium hydroxide:

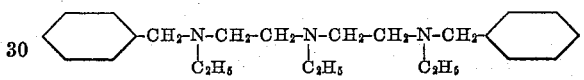

*Example VI*

Preparation of:

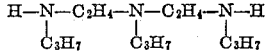

The above compound is prepared by the method described in Example II of United States Patent 2,279,294 by replacing the N,N'-di(o-methyl cyclohexyl)ethylenediamine by a chemical equivalent amount of N,N'-di(n-propyl)ethylenediamine, replacing the o-methylcyclohexylamine by a corresponding amount of isopropyl amine and using the same amount of ethylene dibromide as in the patent. The product may be benzylated as in the preceding examples.

ANTI-GAS FADING USE OF DIBENZYL TRIAMINES

*Example VII*

100 parts of cellulose acetate silk fabric previously dyed with 1,4-di-(monoethylamino)-anthraquinone is placed in a bath consisting of 5000 parts of water at 50° C. containing 40 parts of a 5% aqueous solution of the condensation product of oleic acid chloride and N-methyl taurine. To this bath are added 4 parts of a mixture of the reaction product of methylamine and ethylene chloride of Example I (80%) and 20% of the condensation product of oleic acid chloride and N-methyl taurine prepared according to United States Patent 1,932,180. The bath temperature is gradually raised to 85° C. and maintained for a half hour. After the dyeing is complete, the cloth is removed, rinsed and dried. The dyed cloth shows excellent resistance toward gas fading.

*Example VIII*

Two parts of a mixture of N,N''-dibenzyl-N,N',N''-trimethyl-diethylene triamine (80%) prepared according to Example II and a surface active agent consisting of the condensation product of ethylene oxide with di-isobutylphenol (20%) are added to a dye bath containing 0.6 part of 1-methylamino-4-ethylamino anthraquinone and 100 parts of cellulose acetate fabric. The temperature is gradually raised to 85° C. after which the fabric is worked for 1 hour in the bath at 85° C. After the dyeing is complete, the fabric is removed, washed and dried. The dyed cloth shows excellent resistance toward gas fading.

The above surface active addition product of ethylene oxide may be prepared according to United States Patent 2,213,477.

It is interesting to note that the corresponding triethyl compound gives much less gas fading protection.

*Example IX*

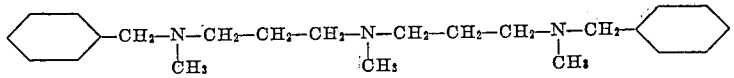

The above compound, derived from 1,3-dichloropropane, methylamine and benzyl chloride, was used in place of the triamine derived from 1,2-dichloropropane of Example VII. A satisfactory protection of the cellulose acetate silk was afforded against gas fading.

*Example X*

Two parts of a mixture consisting of 20% of the condensation product of ethylene oxide with di-isobutylphenol and 80% of benzylated triamine of the following formula:

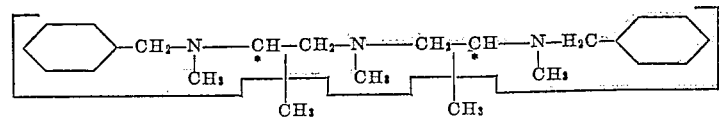

are added to a dye bath containing 16 parts of the dye, 1-hydroxyethylamino-4-ethylamino anthraquinone, and 100 parts of cellulose acetate fabric. The temperature is gradually raised to 85° C. after which the fabric is worked for 1 hour in the bath at 85° C. After dyeing the fabric is removed, washed and dried. The dyed cloth shows excellent resistance to gas fading.

*Example XI*

100 parts of cellulose acetate silk previously dyed with 1,4 - di(monomethylamino)anthraquinone are placed in a bath of 5000 parts of water at 50° C., containing 40 parts of the condensation product of oleic acid chloride and N-methyl taurine. To this bath are added 4 parts of a mixture of 80% of the compound:

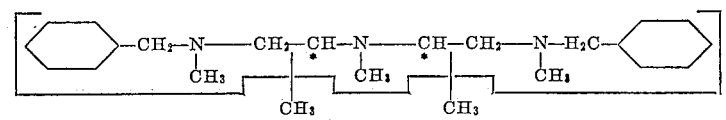

and 20% of the condensation product of ethylene oxide with di-isobutylphenol. The bath temperature is gradually raised to 85° C. and the temperature maintained for a period of one-half hour. After the dyeing is completed, the cloth is withdrawn from the bath, rinsed and dried. The dyed cloth shows very good resistance to gas fading.

It appears from the formula as written that the methyl groups in the above compounds located outside the brackets are attached to the carbon atoms designated by an asterisk. This fact, however, has not been established.

Materials other than those mentioned may be used with the anti-acid faders in question, i. e., fibers or fabrics containing a cellulose ester, such as cellulose formate, cellulose propionate, cellulose butyrate, cellulose-acetate-propionate, cellulose-acetate-butyrate, or cellulose ethers, such as cellulose methyl ether, cellulose ethyl ether, cellulose benzyl ether and the like. Accordingly, we do not intend to be limited in the patent granted except as necessitated by the appended claims

We claim:

1. N,N'' - dibenzyl-N,N',N''-trialkyl-dialkylene triamine characterized by the following general formula:

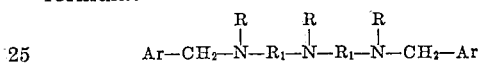

wherein Ar represents a phenyl radical, R represents an alkyl radical of not more than 6 carbon atoms, and $R_1$ represents a lower alkylene radical.

2. N,N'' - dibenzyl - N,N',N''-trimethyl - diethylene triamine characterized by the following formula:

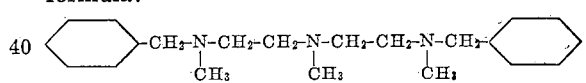

3. N,N'' - dibenzyl - N,N',N'' - triethyl - diethylene triamine characterized by the following formula:

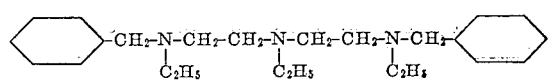

4. N,N'' - dibenzyl - N,N',N'' - trimethyl - ditrimethylene triamine characterized by the following formula:

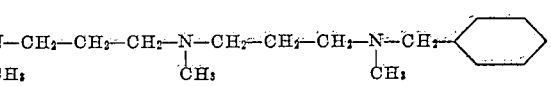

5. N,N'' - dibenzyl - N,N',N'' - triethyl ditrimethylene triamine characterized by the following formula:

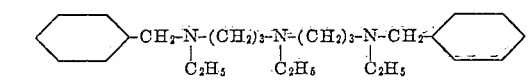

6. N,N'' - dibenzyl - N,N',N'' - trimethyl - dipropylene triamine characterized by the following formula:

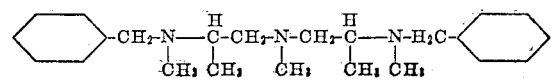

7. The process for the production of N,N''-dibenzyl-polyamines which comprises reacting a lower alkylamine with a lower alkylene dihalide by gradually adding the said halide to the said amine for a three-hour period and thereafter maintaining a temperature ranging from 70-90° C. for a period of two to three hours, cooling the reaction mixture and distilling off the unreacted amine, treating the reaction mixture with caustic alkali and heating it to a temperature of 70-90° C., and distilling the remainder of the unreacted amine, cooling the treated reaction mixture and adding thereto benzene to form a slurry, filtering the alkali salt from the slurry, alkylating the crude reaction mixture with a benzyl halide at a temperature of 60-70° C., distilling off the benzene and treating the alkylated mixture with water to separate it into an aqueous layer and an oily layer containing the N,N''-dibenzyl polyamines.

8. The process according to claim 7, wherein the lower alkylamine is methylamine and the alkylene dihalide is ethylene chloride.

9. The process according to claim 7, wherein the lower alkylamine is methylamine and the alkylene dihalide is 1,2-dichloropropane.

10. The process according to claim 7, wherein the lower alkylamine is methylamine and the alkylene dihalide is trimethylene chloride.

11. The process according to claim 7, wherein the lower alkylamine is ethylamine and the alkylene dihalide is 1,3-dichloropropane.

12. The process according to claim 7, wherein the lower alkylamine is ethylamine and the alkylene dihalide is ethylene chloride.

WILLIAM W. WILLIAMS.
ALBERT F. STROBEL.

REFERENCES CITED

The following references are of record in the file of this patent:

UNITED STATES PATENTS

| Number | Name | Date |
|---|---|---|
| 2,272,783 | Treboux et al. | Feb. 10, 1942 |
| 2,317,757 | Graf | Apr. 27, 1943 |
| 2,334,782 | Martin | Nov. 23, 1943 |

FOREIGN PATENTS

| Number | Country | Date |
|---|---|---|
| 598,312 | Great Britain | Feb. 16, 1948 |